(12) United States Patent
Sohtell et al.

(10) Patent No.: US 12,071,206 B2
(45) Date of Patent: Aug. 27, 2024

(54) SYSTEMS AND METHODS OF COMMUNICATION AMONG ELECTRONIC DEVICES ASSOCIATED WITH WATERCRAFT

(71) Applicant: Navico, Inc., Tulsa, OK (US)

(72) Inventors: Gustav Sohtell, Gothenburg (SE); André Samuelson, Gothenburg (SE)

(73) Assignee: Navico, Inc., Tulsa, OK (US)

( * ) Notice: Subject to any disclaimer, the term of this patent is extended or adjusted under 35 U.S.C. 154(b) by 289 days.

(21) Appl. No.: 17/528,225

(22) Filed: Nov. 17, 2021

(65) Prior Publication Data
US 2023/0150621 A1 May 18, 2023

(51) Int. Cl.
*B63B 49/00* (2006.01)
*H04W 4/46* (2018.01)
*H04W 84/12* (2009.01)

(52) U.S. Cl.
CPC .............. *B63B 49/00* (2013.01); *H04W 4/46* (2018.02); *H04W 84/12* (2013.01)

(58) Field of Classification Search
CPC ......... B63B 49/00; H04W 4/46; H04W 84/12
USPC ............................................................ 701/21
See application file for complete search history.

(56) References Cited

U.S. PATENT DOCUMENTS

| | | | |
|---|---|---|---|
| 10,534,404 B2 | 1/2020 | Bhattacharyya | |
| 2009/0122738 A1* | 5/2009 | Chen | H04L 12/189 370/312 |
| 2011/0149958 A1* | 6/2011 | Jeon | H04W 40/02 370/389 |
| 2016/0011863 A1 | 1/2016 | Isaacson et al. | |
| 2016/0012650 A1 | 1/2016 | Coloney et al. | |
| 2016/0013998 A1 | 1/2016 | Coloney et al. | |
| 2017/0168800 A1* | 6/2017 | Isaacson | H04L 67/34 |
| 2018/0124557 A1 | 5/2018 | Bartley et al. | |
| 2019/0250672 A1* | 8/2019 | Bhattacharyya | G06F 1/182 |

* cited by examiner

*Primary Examiner* — Tiffany P Young
(74) *Attorney, Agent, or Firm* — Nelson Mullins Riley & Scarborough LLP

(57) ABSTRACT

Methods and systems enabling electronic devices associated with each of at least two watercrafts to dynamically form ad hoc wireless networks when the corresponding watercrafts are within range of one another are provided. Data transfer on the water is thus enhanced via such ad hoc mesh-type networks. A method of distributing marine electronics data includes receiving, over a first wireless local area network at an electronic device associated with a first watercraft, marine electronics data from an electronic device associated with a second watercraft; establishing a second wireless local area network between the electronic device associated with the first watercraft and an electronic device associated with a third watercraft; and transmitting the marine electronics data received from the electronic device associated with the second watercraft from the electronic device associated with the first watercraft to the electronic device associated with the third watercraft over the second wireless local area network.

20 Claims, 8 Drawing Sheets

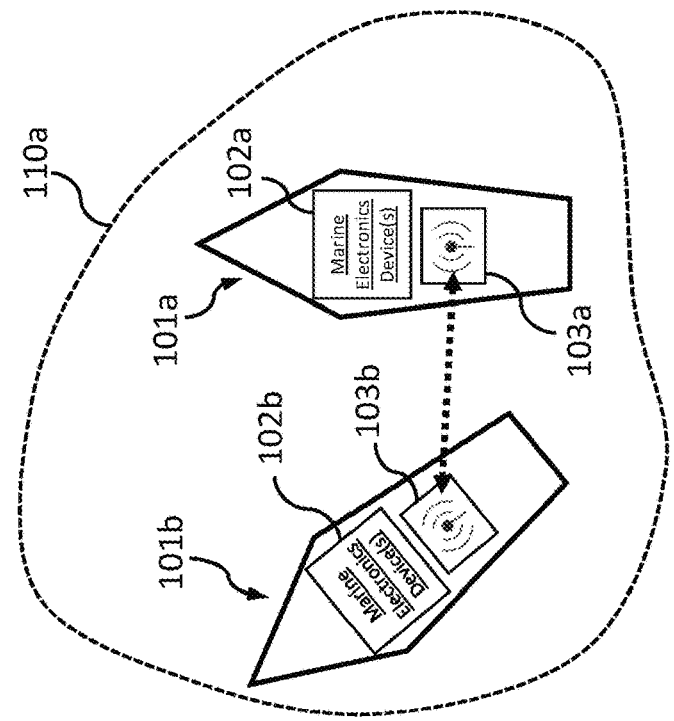
FIG. 2B
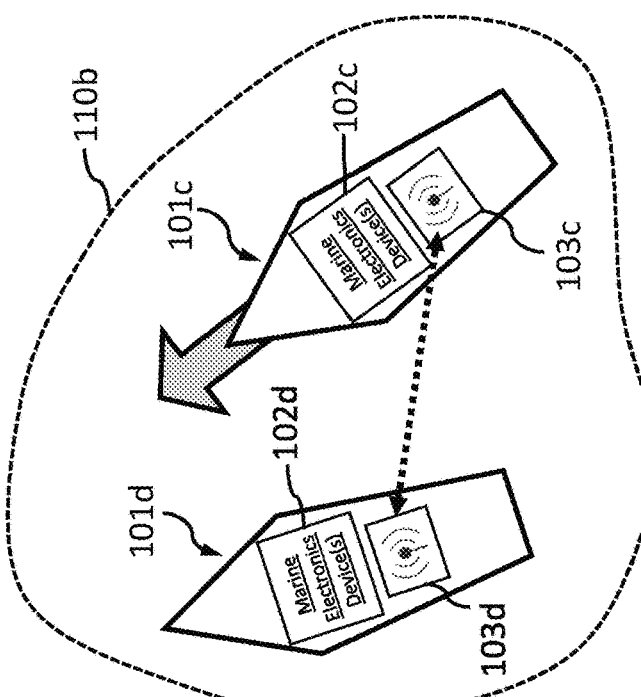 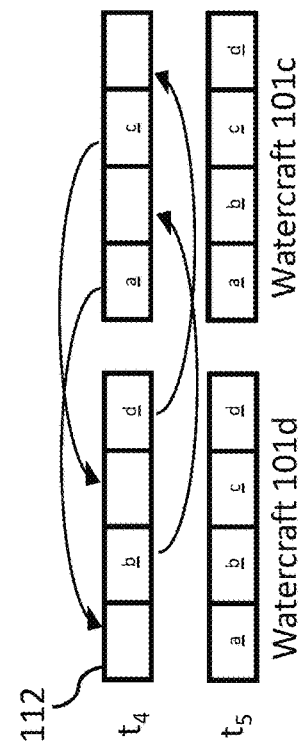

SYSTEMS AND METHODS OF COMMUNICATION AMONG ELECTRONIC DEVICES ASSOCIATED WITH WATERCRAFT

FIELD OF THE INVENTION

Embodiments of the present invention relate generally to systems and methods for communication among electronic devices associated with watercraft and, more particularly, to systems and methods for distributing marine electronics data among a plurality of electronic devices associated with distinct watercraft.

BACKGROUND OF THE INVENTION

Various forms of marine data may be processed and/or displayed using one or more marine electronic devices disposed aboard a vessel. For example, marine electronic devices associated with a watercraft are commonly used to help a user navigate the vessel by providing/displaying marine data, such as sonar data, chart data, radar data, and/or navigation data. Likewise, marine electronic devices are used to control propulsion systems, lighting systems, audio and video entertainment devices, and weather and environmental monitoring systems disposed aboard the watercraft.

While watercraft are increasingly incorporating such electronics, marine electronics data may not be received and/or transmitted by a marine electronics device, for example, until the device is able to access a communications network. Some conventional marine electronics devices, for example, utilize a memory card (e.g., an SD card) that must be physically removed from the marine electronics device and plugged into a networked computer in order to obtain data (e.g., software updates) from a remote computing system and/or upload data (e.g., sonar logs) to a remote computing system. Indeed, even if marine electronic devices are cellular-enabled, access to communications networks may be limited while the watercraft is far from land-based cellular stations. Alternatively, enabling such devices to access satellite communication networks while offshore may unnecessarily consume bandwidth and/or be cost prohibitive.

There remains a need for improved methods and systems for distributing marine electronics data.

BRIEF SUMMARY OF THE INVENTION

Described herein are implementations of various technologies for enabling wireless communication for the sharing of marine electronics data between electronic devices associated with different watercraft.

In some conventional systems, marine electronics data may not be obtained from a remote server and/or marine electronics data may not be uploaded to a remote server without physically removing a memory card from the watercraft or until the marine electronics device is able to establish a reliable connection with the remote server accessible through a wide area network (WAN). Such a situation may be frustrating and/or even prove potentially dangerous where important marine electronics data may not be received by or transmitted from a marine electronics device until the marine electronics can access a cellular network, a satellite network, or a WiFi network (e.g., at a marina), for example. In light of the above, some embodiments of the present teachings provide improved methods and systems for distributing marine electronics data among electronic devices associated with a plurality of watercraft, even in cases in which none of the electronic devices of a plurality of watercraft is able to communicate directly to a remote computing system via wired or wireless communication. In various aspects, the electronic devices associated with a plurality of watercraft may establish a wireless, local area network (LAN) when within wireless communication range of one another so as to gather and/or distribute marine electronics data among the various watercraft. As various watercraft having such data or capable of receiving such data move about the body of water, systems and methods in accordance with the present teachings can enable the formation of one or more additional LANs within which the data may be distributed, thereby allowing the shared data to be relayed over the one or more LANs and be propagated throughout the networks. Such example embodiments may work in the background (e.g., automatically), providing data sharing and desirable updates—which may remove potentially undesirable steps that a user may have to otherwise go through to share data or perform software updates.

In an example embodiment, a method of distributing marine electronics data is provided. The method comprises receiving, at an electronic device associated with a first watercraft having a motor for propelling the first watercraft along a body of water, marine electronics data from an electronic device associated with a second watercraft. The marine electronics data is transmitted over a first wireless local area network established between the electronic device associated with the first watercraft and the electronic device associated with the second watercraft. The method further includes establishing a second wireless local area network between the electronic device associated with the first watercraft and an electronic device associated with a third watercraft. The method further includes transmitting at least a portion of the marine electronics data received from the electronic device associated with the second watercraft from the electronic device associated with the first watercraft to the electronic device associated with the third watercraft over the second wireless local area network.

In some embodiments, the method further includes, in an instance in which an intended final recipient of marine electronics data stored by the electronic device associated with the first watercraft is a remote server and the electronic device associated with the first watercraft is communicatively coupled to the remote server, the electronic device associated with the first watercraft transmitting the stored marine electronics data to the remote server. In some embodiments, the method further includes, in an instance in which the electronic device associated with the first watercraft is not communicatively coupled to the remote server, the electronic device associated with the first watercraft transmitting the stored marine electronics data to an electronic device associated with another watercraft over a third wireless local area network established therebetween. In some embodiments, the electronic device associated with the first watercraft is communicatively coupled to the remote server via a wide area network. In some embodiments, the wide area network comprises a cellular network, a satellite network, or the Internet.

In some embodiments, in the instance in which the intended final recipient of the stored marine electronics data is the remote server and the stored marine electronics data is transmitted to the remote server from the electronic device associated with the first watercraft, the electronic device associated with the first watercraft is configured to no longer transmit the stored marine electronics data to electronic devices associated with other watercraft.

In some embodiments, the marine electronics data received from the electronic device associated with the second watercraft comprises marine electronics data provided by a remote server for controlling operation of a plurality of electronic devices, each of which is associated with one of a plurality of watercraft.

In some embodiments, the marine electronics data received from the electronic device associated with the second watercraft comprises marine electronics data generated by one or more electronic devices associated with the second watercraft. In some embodiments, the marine electronics data received from the electronic device associated with the second watercraft comprises marine electronics data generated by an electronic device associated with a third watercraft.

In some embodiments, the first and second wireless local area network comprises a mesh network.

In some embodiments, the marine electronics data comprises a marine electronics software update data file.

In some embodiments, the method further comprises transmitting a beacon from the electronic device associated with the first watercraft to notify the electronic device of the third watercraft that the first watercraft is available to establish the second wireless local area network. In some embodiments, the method further comprises receiving, at the electronic device associated with the first watercraft, a response to the beacon generated by the electronic device associated with the third watercraft. In some embodiments, the response comprises a request by the electronic device associated with the third watercraft for at least a portion of the marine electronics data received from the second watercraft.

In some embodiments, the method further comprises receiving, at the electronic device associated with the first watercraft, a beacon transmitted from the electronic device associated with the third watercraft to notify the electronic device of the first watercraft that the third watercraft is available to establish the second wireless local area network.

In some embodiments, the marine electronics data received from the electronic device associated with the second watercraft comprises information regarding a number of hops to which the marine electronics data has been subjected, and wherein the information regarding the number of hops is adjusted by the electronic device associated with the first watercraft when the marine electronics data received from the electronic device associated with the second watercraft is transmitted to the electronic device associated with the third watercraft.

In some embodiments, the marine electronics data received from the electronic device associated with the second watercraft comprises information regarding a number of hops to which the marine electronics data has been subjected, and wherein the electronic device associated with the first watercraft prevent transmission of the marine electronics data to the electronic device associated with the third watercraft when the number of hops to which the marine electronics data exceeds a predetermined maximum number of hops.

In some embodiments, the marine electronics data received from the electronic device associated with the second watercraft comprises at least a first portion of a data file divided into a plurality of portions. The electronic device associated with the first watercraft is configured to obtain a second portion of the plurality of portions from another electronic device associated with a different watercraft from the second watercraft. The electronic device associated with the first watercraft is configured to transmit the first portion and the second portion to the electronic device associated with the third watercraft.

In another example embodiment, an electronic device associated with a watercraft having a motor for propelling the watercraft along a body of water is provided. The electronic device comprises a transceiver, one or more processors, and a memory including computer program code configured to, when executed, cause the one or more processors to receive, via the transceiver, marine electronics data transmitted from an electronic device associated with a second watercraft over a first wireless local area network; establish a second wireless local area network with an electronic device associated with a third watercraft; and transmit, via the transceiver, at least a portion of the marine electronics data received from the electronic device associated with the second watercraft to the electronic device associated with the third watercraft over the second wireless local area network.

In yet another example embodiment, a non-transitory computer-readable medium is provided. The computer-readable medium has stored thereon a plurality of computer-executable instructions which, when executed by a computer cause the computer to receive, at an electronic device associated with a first watercraft having a motor for propelling the first watercraft along a body of water, marine electronics data from an electronic device associated with a second watercraft, wherein the marine electronics data is transmitted over a first wireless local area network established between the electronic device associated with the first watercraft and the electronic device associated with the second watercraft; establish a second wireless local area network between the electronic device associated with the first watercraft and an electronic device associated with a third watercraft; and transmit at least a portion of the marine electronics data received from the electronic device associated with the second watercraft from the electronic device associated with the first watercraft to the electronic device associated with the third watercraft over the second wireless local area network.

Additional example embodiments of the present invention include methods, systems, and computer program products associated with various embodiments described herein.

BRIEF DESCRIPTION OF THE DRAWINGS

Figure 1:
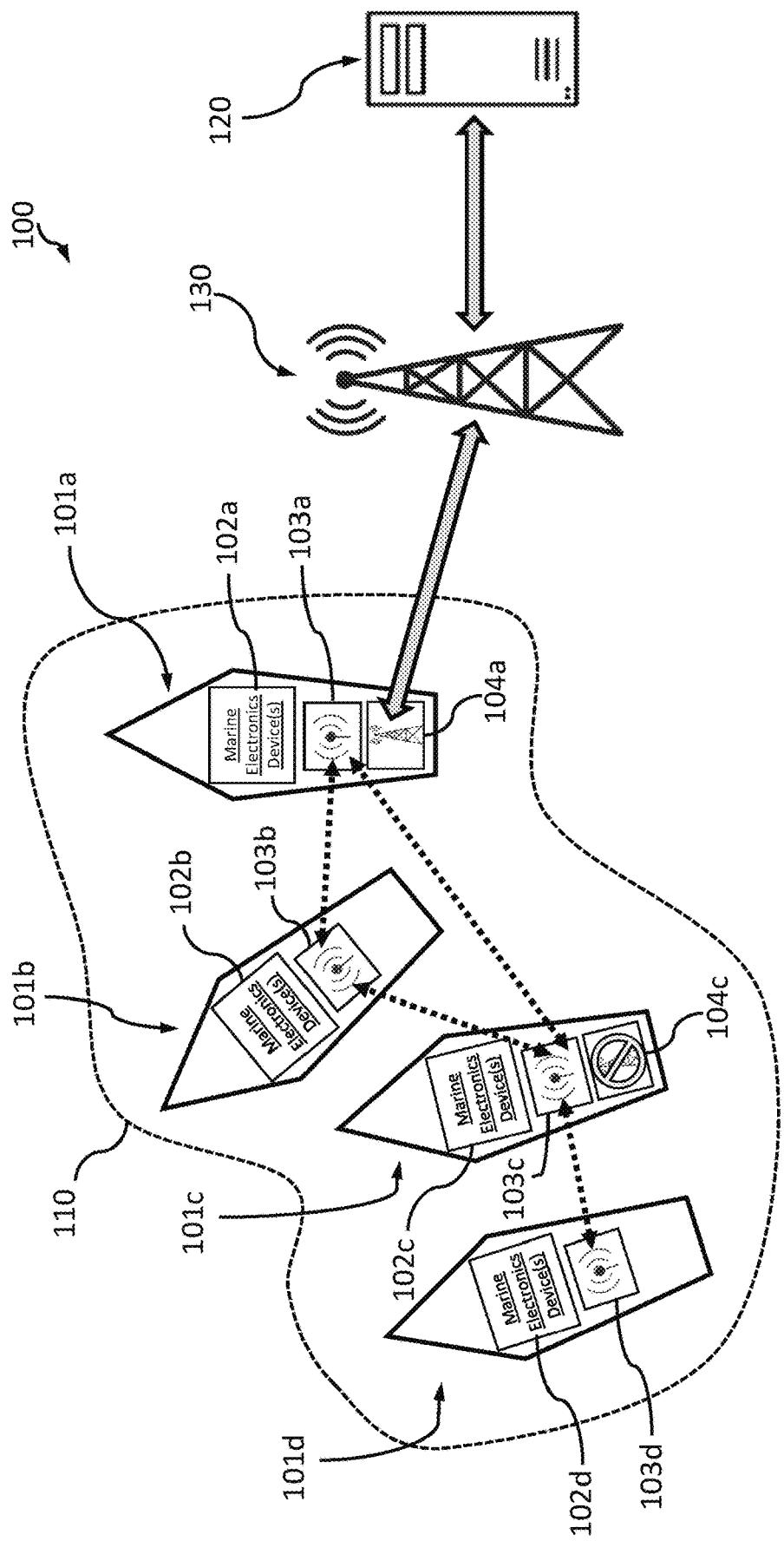
Figure 2A:
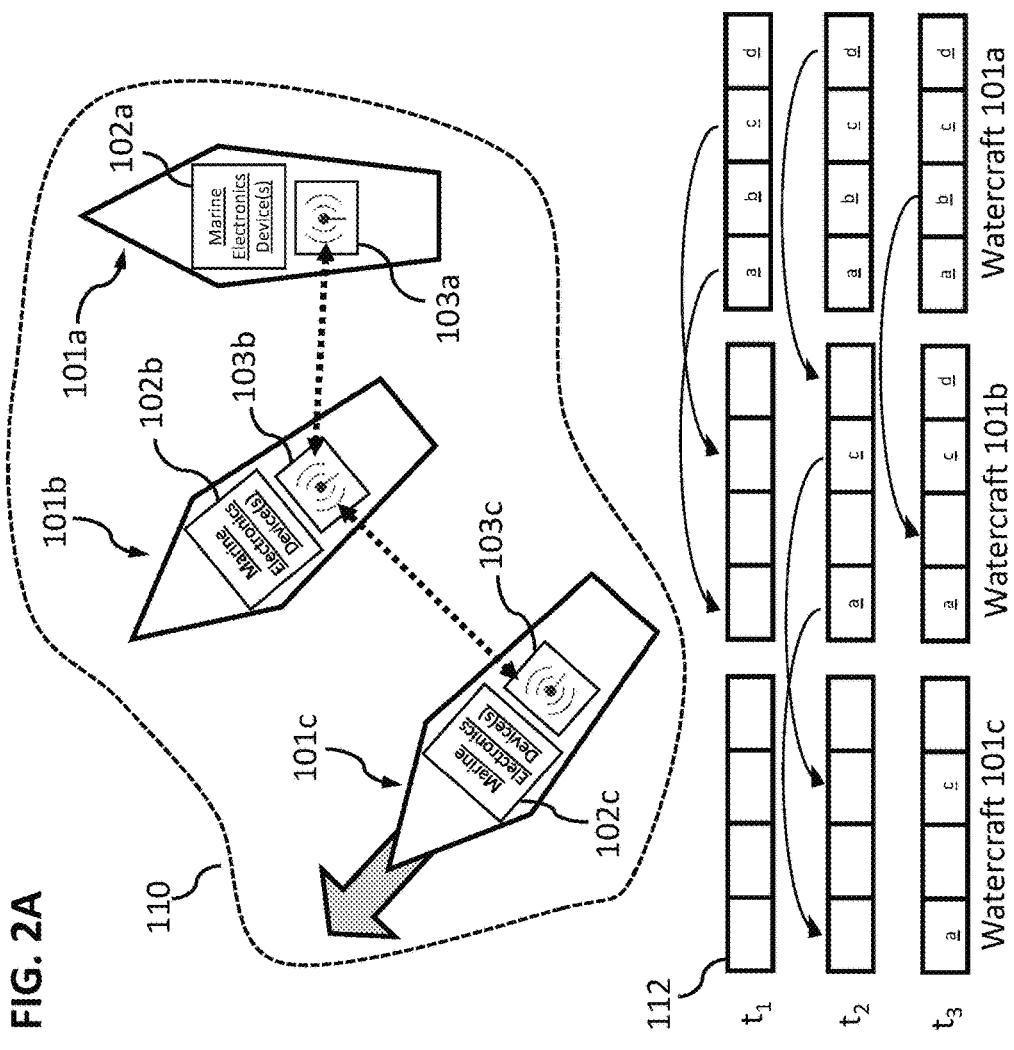
Figure 2A:
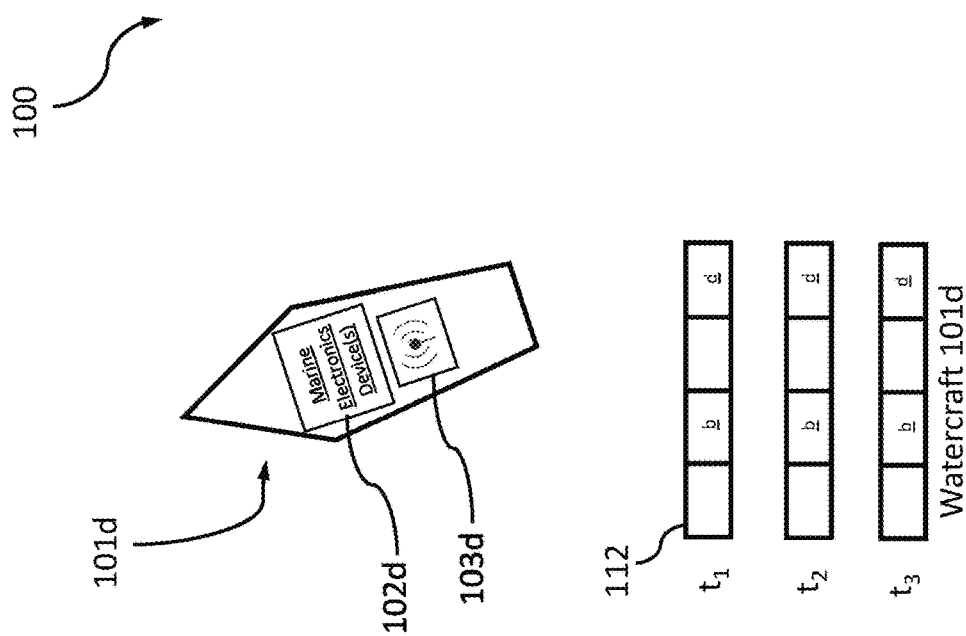
Figure 3:
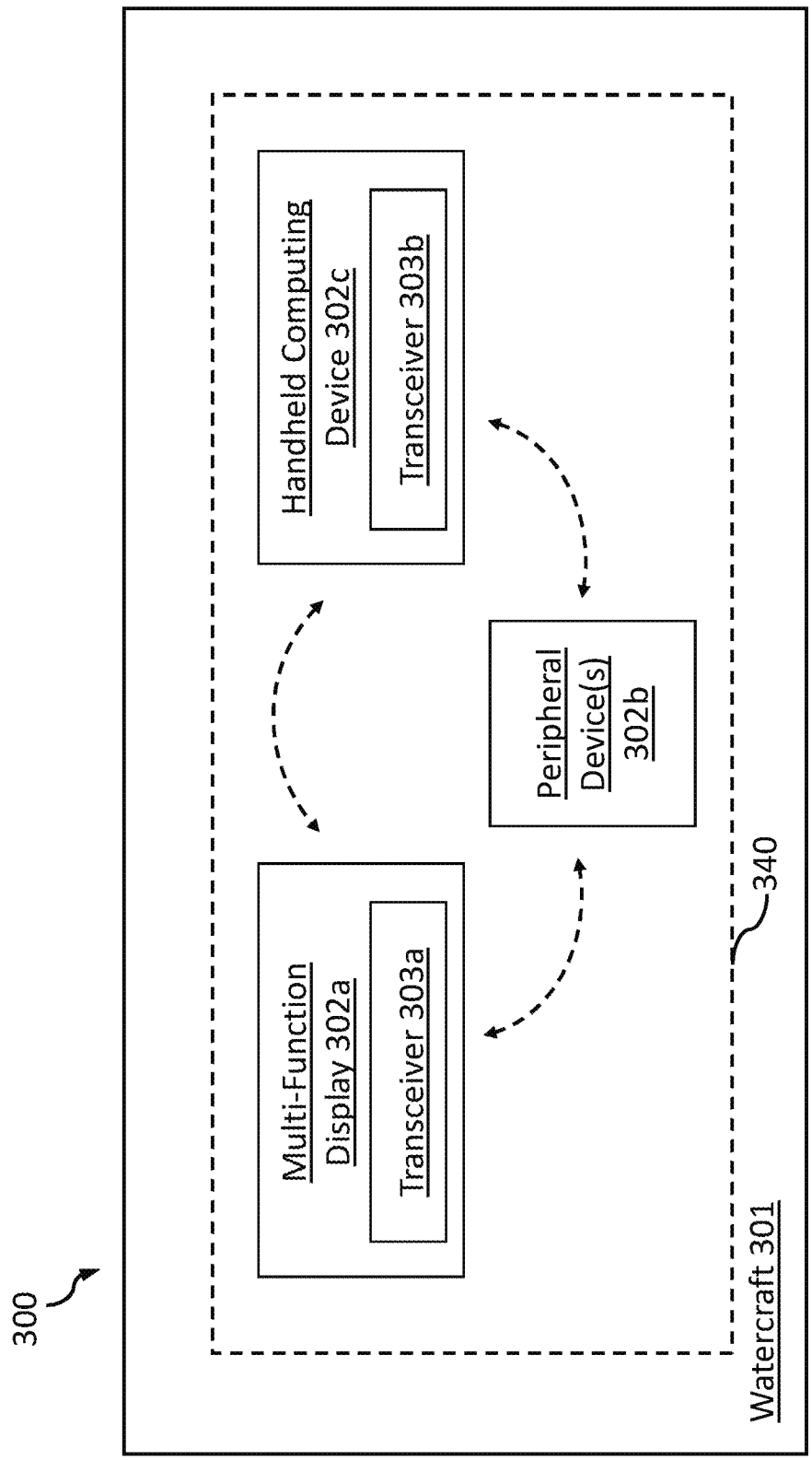
Figure 4:
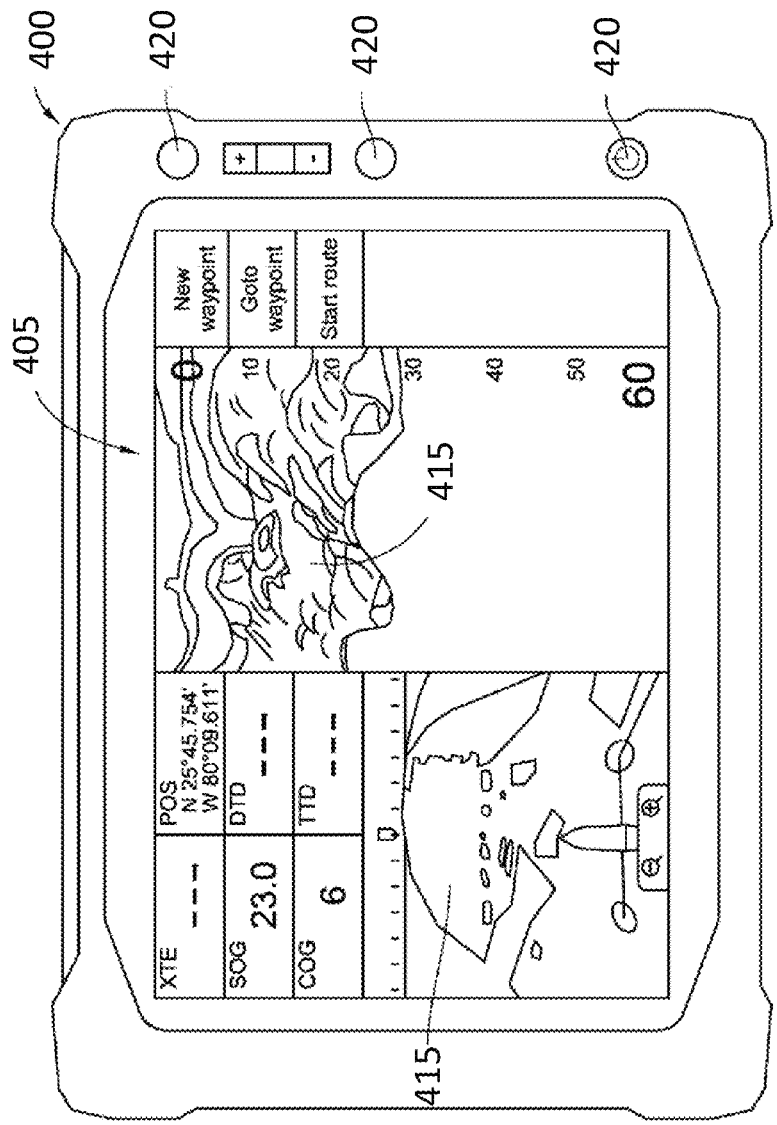
Figure 5:
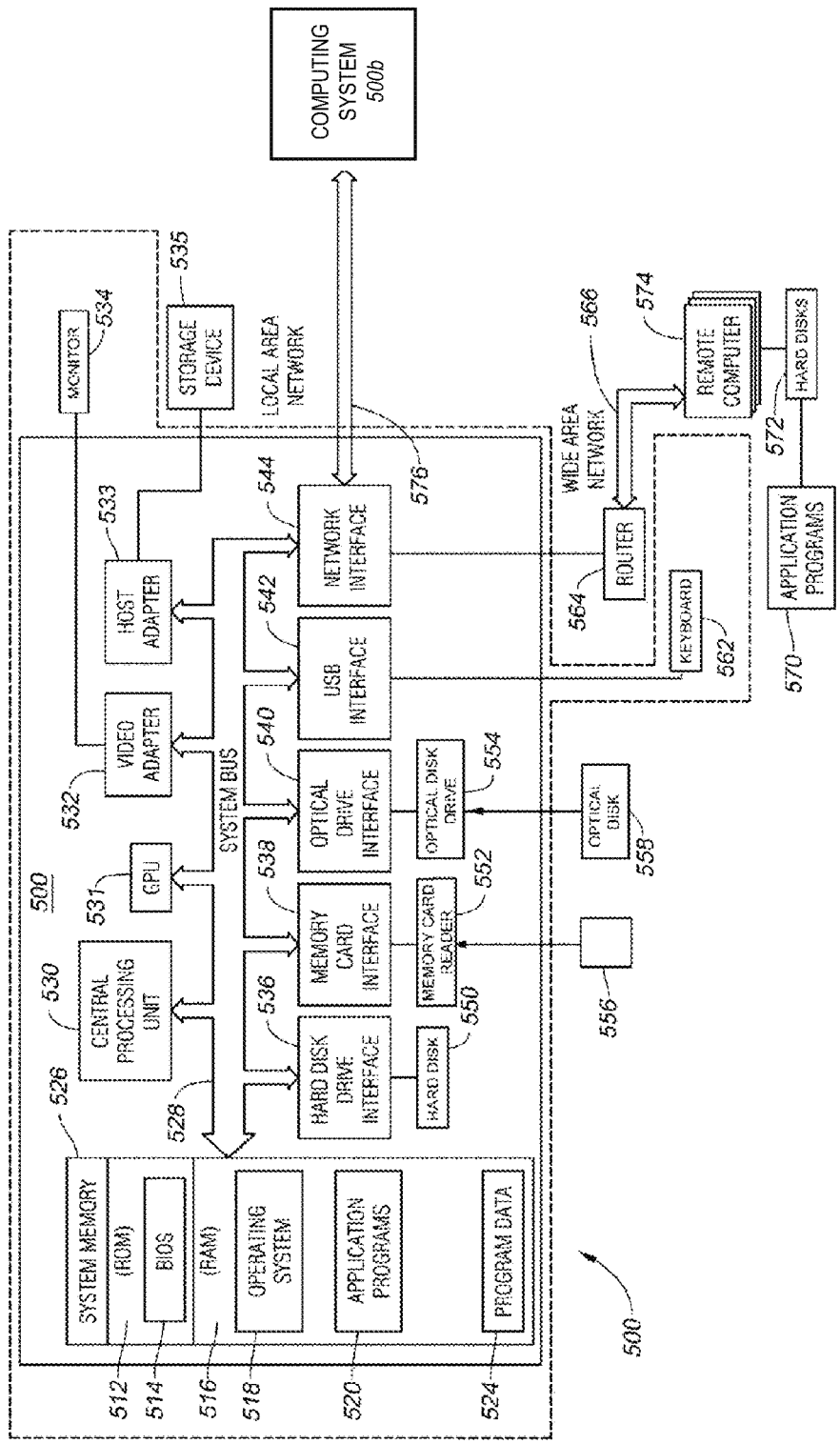
Figure 6:
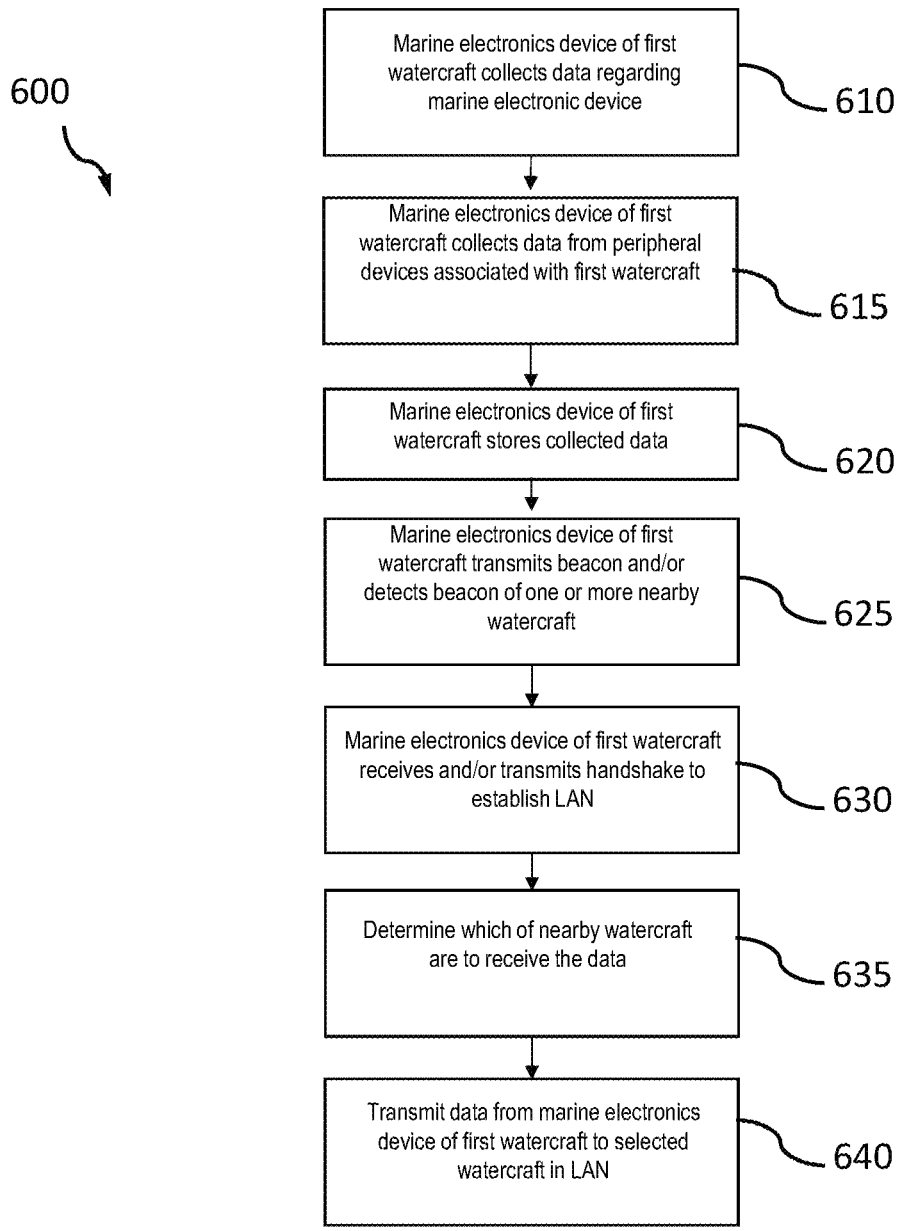
Figure 7:
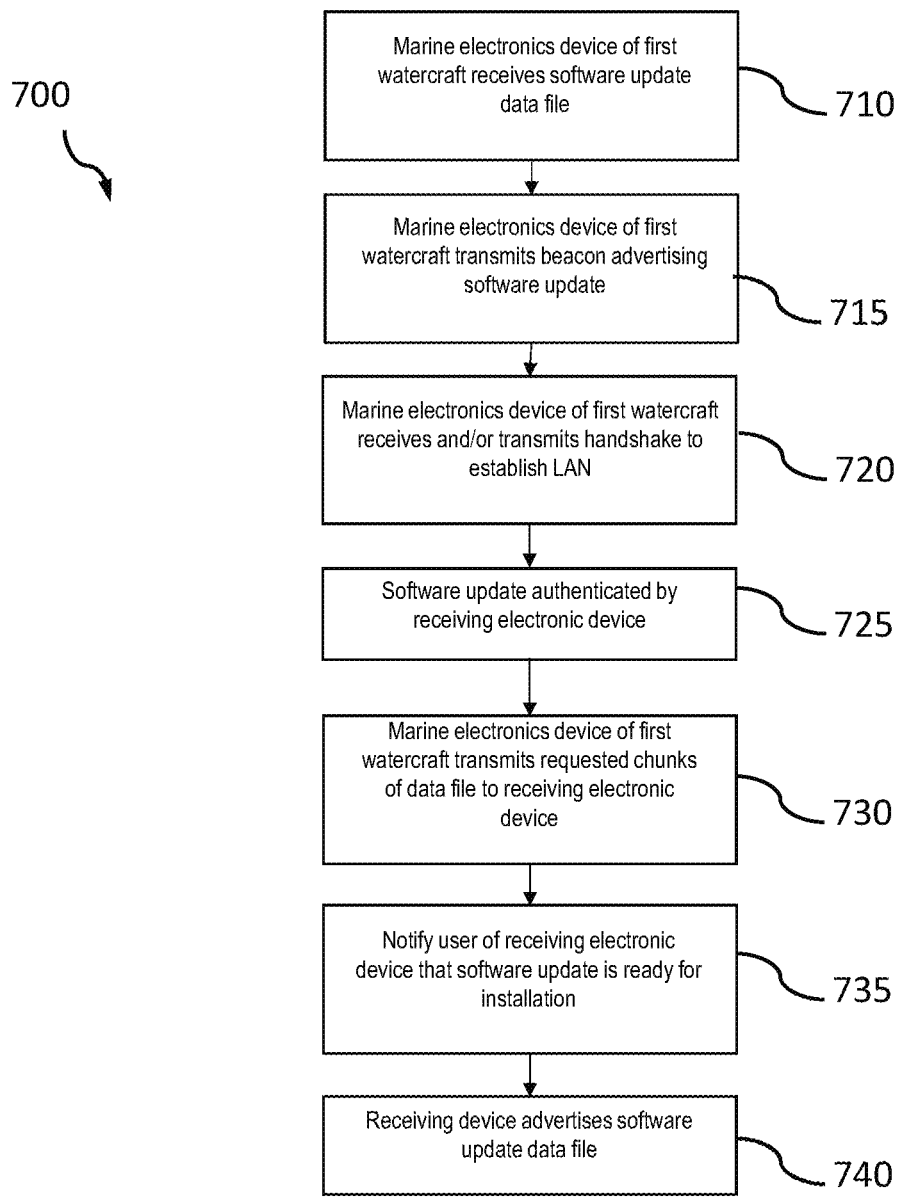

Having thus described the invention in general terms, reference will now be made to the accompanying drawings, which are not necessarily drawn to scale, and wherein:

FIG. 1 illustrates an example communications network system between electronic devices associated with a plurality of watercraft according to an embodiment of the present teachings;

FIGS. 2A-B illustrate various aspects of an implementation of the system of FIG. 1, in accordance with some embodiments discussed herein;

FIG. 3 illustrates a schematic representation of a marine networking system associated with a watercraft, in accordance with some embodiments discussed herein;

FIG. 4 illustrates a marine electronics device associated with a watercraft, in accordance with some embodiments discussed herein;

FIG. 5 is a schematic diagram of a computing system of a marine electronics device associated with a watercraft, in accordance with some embodiments discussed herein;

FIG. 6 is a flow diagram of a method for distributing data among electronic devices associated with a plurality of watercraft, in accordance with some embodiments discussed herein; and FIG. 7 is a flow diagram of a method for distributing data among electronic devices associated with a plurality of watercraft, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

In accordance with various aspects of the present teachings, the disclosed methods and systems can provide for communication between electronic devices associated with a plurality of watercraft (also referred to herein as vessels). In certain aspects, the present teachings enable electronic devices associated with each of at least two vessels to dynamically form ad hoc wireless networks when the respective electronic devices are within wireless range of one another. As vessels having electronic devices generating or utilizing marine electronics data (or capable of receiving such data) move about the body of water, for example, the systems and methods described herein enable the distribution of such data within the ad hoc networks, thereby relaying the marine electronics data among the electronic devices associated with the various vessels. In this manner, marine electronics data may be gathered and propagated among electronic devices aboard the vessels, even if none of the electronic devices is directly connected (nor capable of directly connecting) to a wide area network, for example, through cellular-, satellite-, or Internet-based communications.

FIG. 1 illustrates an example communications network system 100 according to an embodiment of the present teachings. As shown, system 100 includes a plurality of watercraft 101a-d, each of which comprises a motor that is configured to propel the watercraft over a body of water. One or more marine electronic devices 102a-d associated with each watercraft 101a-d are configured to generate, store, or otherwise process marine electronics data (e.g., digital data) associated with operation of the watercraft 101a-d. In various aspects, each of the watercraft 101a-d and/or respective electronic devices 102a-d associated therewith include at least one transceiver 103a-d that allows the formation of a wireless local area network (LAN) 110 with the electronic devices of other nearby watercraft (although individual LANs may be established between two or more of the watercraft, and an overall LAN (e.g., a mesh-type network) may be formed as a combination of multiple such individual LANs). The transceivers 103a-d can utilize any wireless technology standard for exchanging data between devices such as infrared, UWB, Bluetooth, Bluetooth Low Energy, WiFi, Zigbee, Z-Wave, Thread, or any other short-, medium-, or long-range wireless technology known in the art or hereafter developed.

The LAN 110 formed by two or more electronic devices 102a-d of watercraft 101a-d can have a variety of network topologies, though generally the present teachings utilize dynamic and adaptive routing protocols that allow for the creation of an ad hoc network providing a direct communication link for each electronic device 102a-d with at least one electronic device 102a-d of another nearby watercraft 101a-d. For example, communication between any two electronic devices 102a-d in the ad hoc LAN 100 is not dependent on the presence of one or more fixed routers or access points (APs) through which two electronic devices 102a-d must communicate. Rather, as the watercraft 101a-d move about the body of water, the ad hoc LAN 110 allows the electronic devices 102a-d of each watercraft 101a-d to dynamically change its wireless communication links to the electronic devices 102a-d of other watercraft 101a-d to allow it to communicate directly therewith. In this manner, wireless communication between various electronic devices 102a-d of the watercraft 101a-d within the ad hoc LAN 110 may still remain even if one of the electronic devices 102a-d becomes disconnected, for example, by the watercraft 101a-d moving out of transmission range of the electronic devices 102a-d of any other of the watercraft 101a-d.

In certain aspects, the ad hoc LAN 110 formed between the watercraft 101a-d may be configured as a mesh network such that each electronic device 102a-d may not only communicate directly with electronic devices 102a-d of other watercraft within its transmission range but may also act as an intermediary relative to the other networked devices. For example, as shown in FIG. 1, while the transceiver 103d of watercraft 101d is only within range of the transceiver 103c of watercraft 101c (i.e., electronic device 102d cannot directly communicate with the electronics devices 102a,b of watercraft 101a,b), the mesh LAN 110 allows all devices within the network to communicate with one another through one or more "hops." That is, though the electronic device 102d of watercraft 101d may only be able to directly share marine electronics data directly with the electronic device 102c of watercraft 101c as indicated by the dotted line extending between transceivers 103c/d in FIG. 1, the mesh configuration of LAN 110 in accordance with various aspects of the present teachings allows the electronic device 102c to act as an intermediary router to re-transmit packets received from electronic device 101d to the other networked devices. The electronic device 102a associated with watercraft 101a, for example, may obtain data indirectly from the electronic device 102d watercraft 101d either in a single hop (e.g., via electronic device 102c of watercraft 101c) or through multiple hops (e.g., via the electronic device 102c of watercraft 101c and the electronic device 102b of watercraft 101b).

It will be appreciated in light of the present teachings that the mesh LAN 110 of FIG. 1 may beneficially provide a dynamic and resilient network configuration to assist in the transfer of data among the electronic devices 102a-d associated with watercraft 101a-d within LAN 110. For example, if a marine electronics device of a first watercraft that is a source of data and a marine electronics device of a second watercraft that is an intended destination for data are not within transmission range of the associated transceivers, data can nonetheless reach the intended destination in the LAN 110 by being passed through the electronic devices of one or more intermediate watercraft. Likewise, if one or more of the electronic devices of the watercraft within the mesh LAN 110 are defective, another data path could be found. For example, as shown in FIG. 1, if watercraft 101b were to remove itself from proximity of the watercraft 101a and 101c (or the marine electronics 102b or transceiver 102b were defective), data originating at the electronic device 102d of watercraft 101d could still be shared with the electronic device 102a of watercraft 101a through the electronic device 102c of watercraft 101c via the mesh LAN 110. Thus, the coverage area of the mesh, ad-hoc network 110 expands as the number of watercraft configured in accordance with the present teachings increases.

In some example embodiments, marine electronics data shared within the mesh LAN 110 may also be delivered to or received from a remote computing system. For example, with continued reference to FIG. 1, the system 100 may comprise one or more remote servers 120 that may be a source of marine electronics data and/or a target recipient of the marine electronics data generated by the marine electronic devices 102a-d of the watercraft 101a-d. By way of non-limiting example, the server 120 may include one or more server logic devices (or server computing devices), which may generally include a processor, a non-transitory memory or other storage device for housing programming instructions, data or information regarding one or more applications, and other hardware, including, for example, a central processing unit (CPU), read only memory (ROM), random access memory (RAM), communication ports, a controller, and/or memory devices. In some aspects, the remote server 120 may be a cloud server accessible via the Internet, which may be operated by a vendor.

In some example embodiments, a remote server 120 accessible via a wide area network (WAN) can be accessed by one or more electronic devices 102a-d of watercraft 101a-d in mesh LAN 110 using various communication and data transfer protocols, such as any of the various protocols known to those having ordinary skill in the art. Non-limiting examples of such protocols include Bluetooth, hypertext transfer protocol (HTTP), Ethernet, WiFi, cellular communication protocols (e.g., 3G, 4G, LTE, etc.), and satellite-based communication protocols. As shown in FIG. 1, for example, the electronic devices of each of watercraft 101a and 101c are associated with a cellular transceiver 104a,c capable of wirelessly connecting to a cellular network 130, although the cellular transceiver 104c of watercraft 101c is disabled and/or out of range of the cellular network 130. Indeed, it will be appreciated in light of the present teachings that such WAN connectivity is not necessary in order to establish and/or operate the example mesh LAN 110 in accordance with the present teachings. That is, marine electronics data may nonetheless be shared between the electronic devices 102a-d of watercraft 101a-d of the LAN 110 even if every watercraft 101a-d is disconnected from the cellular network 130 or other WAN (e.g., the Internet).

In various aspects, access to the remote server 120 can be obtained before, during, or after formation of the one or more ad hoc networks among the electronic devices 102a-d of the plurality of watercraft 101a-d. By way of example, the electronic device 102a of a docked watercraft 101a may receive marine electronics data comprising a software update to marine electronics hardware from the remote server 120 (e.g., a remote computing system operated by a marine electronics vendor) through a marina WiFi network, and the software update may be transmitted to other watercraft in proximity to watercraft 101a as the various watercraft subsequently move about the body of water, thus distributing the software update among the electronic devices of the other watercraft. Alternatively, as with some conventional marine electronics devices, a memory card (e.g., an SD card) can obtain such a software update from the remote server 120 by being plugged into a networked computer having access to the WAN. Upon reinserting the memory card within the marine electronics device of a particular watercraft, the software update obtained from remote server 120 may be transmitted to other watercraft as the one or more ad hoc LAN 110 are formed between the electronic devices of the other watercraft.

Accessing the remote server 120 can also occur after the LAN 110 has been formed and marine electronics data has been distributed among the plurality of watercraft 101a-d. By way of example, if watercraft 101d has generated data (e.g., environmental data, sonar logs) that is ultimately intended to be uploaded to the remote server 120, such data may be distributed to the various electronic devices within LAN 110 while out at sea including, for example, the electronic device 102a of watercraft 101a. Upon the electronic device 102a of watercraft 101a connecting to the remote server 120 via the cellular network 130 or other WAN (e.g., via a WiFi connection at the marina), the data generated by the electronic device 102d of watercraft 101d can be uploaded to the remote server 120 for further processing, storage, etc. As with some conventional marine electronics devices, a memory card associated with the marine electronics device 102a of watercraft 101a and containing the data received from watercraft 101d may be alternatively plugged into a networked computer having access to the WAN in order to upload such data to the remote server 120.

Formation of the LAN 110 among the electronic devices of a plurality of proximate watercraft can be initiated in any manner known in the art or hereafter developed. For example, in certain aspects, the transceiver 103a-d associated with each watercraft 101a-d can be caused to generate (e.g., under the control of a controller associated with the electronic device) a beacon indicating to other devices within transmission range that the device is present and/or ready to accept a request for wireless connection. The beacon may be transmitted at a regular intervals (e.g., every few seconds) to determine if any new LAN-enabled watercraft are present and available to initiate a communications session. Similarly, the transceiver 103a-d associated with each watercraft can be configured to detect a beacon, for example, by scanning a particular frequency to identify nearby devices and initiate a "handshake" with the device transmitting the beacon. In this manner, a wireless communication session may be initiated upon two watercraft coming into range of one another based on the detection of another vessel's beacon. By way of non-limiting example, in an instance in which the transceivers 103a-d rely on the Bluetooth communication protocol, each Bluetooth-enabled device may send advertising packets (PDUs) to allow other similarly-enabled devices to connect to form ad hoc LAN 110.

While the mesh LAN 110 in accordance with various aspects of the present teachings may beneficially provide for redundancy through transmission of data to multiple watercraft within the LAN 110, various aspects of the present teachings may increase the efficiency of network communications based on additional information associated with the beacon and/or the data to be distributed. For example, in addition to identifying the presence of a LAN-enabled electronic device, the beacon and/or other advertisement data packets may include an inventory of the data maintained by the electronic device and the services offered. For example, in some example embodiments, the inventory from one or more electronic devices associated with the watercraft can identify the data available for distribution, the device's current connection status and/or connectability with a WAN, the target of the data, the importance of the data, the age of the data, and/or the number of "hops" to which the data has already been subjected, all by way of non-limiting example. In certain aspects, one of the devices forming the wireless link can request one or more particular of the services offered by the other device. As discussed below, for example, a device 102a-d seeking to complete the download of a data file partially obtained from an earlier communication session may request the missing portions of the data file.

In certain aspects, the distribution of data among the plurality of watercraft within the mesh LAN 110 may be adjusted to optimize transmission of the data to an intended target and/or to avoid unnecessary data transmission to various watercraft within the LAN 110 based on information contained within the advertisement. By way of example, access to the remote server 120 (e.g., through cellular network 130) can occur while one or more of the watercraft are also connected to other watercraft within the LAN 110. For example, as shown in FIG. 1, the electronic device 102a of watercraft 101a in FIG. 1 may be coupled to the remote server 120 through a cellular network 130 via transceiver 104a while the device 102a is also connected to the LAN 110 via transceiver 103a. In such aspects, if data generated by the electronic device 102b associated with watercraft 101b is indicated as being intended for delivery to the remote server 120, the system 100 may be configured to deliver the data to the WAN-connected device(s) (e.g., electronics device 102a) or the WAN-accessible device(s) (e.g., electronics device 102c) rather than distributing the data to all interconnected devices within the LAN 110.

As another example, data may be classified according to its importance and/or timeliness such that the distribution of such data may be adjusted so as to optimize the use of LAN 110 resources and/or those of the electronic devices 102a-d (e.g., data storage). For example, if certain data generated by watercraft 101c of FIG. 1 is indicated as critical within an advertisement data packet upon forming a network with watercraft 101a, 101b, and 101d, the system 100 can prioritize transmission of such critical data to each of the other watercraft within the network relative to less critical data. Alternatively, if the data is less critical or no longer timely (e.g., data regarding weather conditions during a since passed storm), the system 100 could be configured to distribute such data within LAN 110 only after the transmission of more critical data and/or by distributing such data to fewer nearby watercraft. In various aspects, the advertisement may include an indication of the number of hops that the data has been subjected to since the generation of such data to limit further transfer of non-critical data, for example, if the number of hops surpasses a pre-determined number. By way of non-limiting example, electronic device 102d may indicate to device 103c that the data transmitted by electronic device 102d has already been subjected to multiple hops prior to the current transfer to device 103c. The electronic device 103c may therefore increment a hop counter provided to another recipient upon subsequent transmission (e.g., to device 102b or 102a) or the electronic device 103c may be prevented from transmitting such data if the counter violates the maximum number of hops.

Notably, though FIG. 1 depicts a snapshot of LAN 110 in which the watercraft are all simultaneously within proximity to each other, the present teachings enable the continual formation of mesh, ad hoc networks between a plurality of watercraft and the subsequent transmission of marine electronics data among such networks as the vessels move about on the body of water. With reference now to FIGS. 2A-B, various implementations of example system 100 in accordance with the present teachings will be described. First, as shown in FIG. 2A, a mesh LAN 110 has been formed between the electronic devices associated with watercraft 101a-c. In particular, the electronic devices 102a,b watercraft 101a,b are in direct communication with one another as indicated by dotted arrows extending between the respective transceivers 103a,b. Likewise, transceivers 103b,c are within transmission range of one another so as to enable direct communication between electronic devices 102b,c associated with watercraft 101b,c. Though the transceivers 103a and 103c are not within transmission range of one another as shown in FIG. 2A, the formation of a mesh LAN 110 between transceivers 103a-c enables the electronic device 102b of watercraft 101b to operate as a relay between the electronic devices 102a,c in accordance with various aspects of the present teachings. As shown, watercraft 101d is not within transmission range of any of transceivers 103a-c and is thus not connected to the mesh LAN 110.

Whereas in some conventional systems an incomplete download of data (e.g., a large file representing a software update) may result in the download failing such that partially-obtained data is discarded, certain aspects of the present teachings may utilize a protocol in which a large data file may be fragmented into chunks that may be transferred individually by various watercraft within the peer-to-peer network of mesh LAN 110. If the complete download from a first watercraft is not completed, for example because the recipient or the source watercraft leaves the network, other chunks or fragments of the data file may be obtained from other peers (e.g., watercraft) within the same mesh network or a subsequently-established mesh network. BitTorrent is one example of such a peer-to-peer file sharing protocol suitable for use in accordance with the present teachings.

With reference again to FIG. 2A, a cache 112 associated with the electronics devices 102a-d of each of the watercraft 101a-d is schematically indicated as containing various chunks 112a-d of a data file, the chunks which together represent an entire executable file (e.g., a software update) for one or more electronic devices 102a-d aboard the respective watercraft 101a-d. In particular, at the time of the formation of the LAN 110 (i.e., time $t_1$), the cache 112 associated with watercraft 101a contains the entire file for the software update 112a-d (e.g., previously downloaded from a remote server when vessel 101a was docked at the marina), while neither of the electronic devices 102b,c associated with the vessels 101b,c has received any part of the software update. The cache 112 associated with watercraft 101d contains chunks 112b,d at time $t_1$.

At time $t_2$ after the initiation of wireless communication between the electronic devices 102a,b as otherwise discussed herein, chunks 112a,c have been transmitted from the electronic device 102a associated with watercraft 101a to the electronic device 102b of watercraft 101b and stored in the associated cache 112. Subsequently, between time $t_2$ and time $t_3$, chunk 112d has been transmitted to the electronic device 102b associated with watercraft 101b and stored with cache 112. In addition, advertisement of the data in cache 112 by the electronic device 102b may enable the relay of at least a portion of the data to the electronic device 102c associated with watercraft 101c, for example, upon a request for this data by the electronic device 102c. However, because watercraft 101c is moving in the direction of the arrow and exits the LAN 110 prior to completing the download of all available chunks within the cache 112 associated with from watercraft 101b, the electronic device 102c associated with watercraft 101c is only able to obtain a portion of the software update data file (i.e., chunks 112a,c) by the time the connection is dissolved.

With reference now to FIG. 2B, the system is depicted at a subsequent time in which the watercraft 101c has moved within transmission range of watercraft 101d, thereby enabling the formation of a second LAN 110b, while the electronic devices 102a,b associated with watercraft 101a,b remain wirelessly connected via LAN 110a. As indicated schematically with reference to LAN 110a, between time $t_3$ and time $t_4$, the final chunk 112b of the software update data file has been transmitted to watercraft 101b such that both electronic devices 102a,b associated with watercraft 101a,b contain the complete file. With reference to LAN 110b, upon initiating communication between the electronic devices 102c,d associated with watercraft 101c,d at time $t_4$, a peer-to-peer file sharing protocol thereby enables the transfer of chunks 112a,c from electronic device 102c to electronic device 102d. Likewise, chunks 112b,d may be transferred from electronic device 102d to the electronic device 102c such that the cache associated with both watercraft 101c,d also contain the complete file at time $t_5$.

As will be appreciated in light of the present teachings, systems exemplified herein provide for the distribution of data between the electronic devices associated with a plurality of watercraft. Beneficially, ad hoc LANs formed in accordance with various aspects of the present teachings enable such a distribution without an device needing to be coupled to a WAN and also account for the frequent movement of the watercraft into and out of transmission range of one another. Indeed, not only does the coverage area of example mesh, ad-hoc networks described herein expand as the number of watercraft in proximity to one another increase, but the movement of the watercraft can lead to the formation of new mesh networks (or mesh network portions), thereby providing access to an even larger data distribution area. Moreover, the dissolution and formation of multiple mesh networks as the watercraft move about a body of water may also beneficially provide for the collection of location data of the watercraft as they come within transmission range of one another. In various aspects, the location data associated with the formation of each LAN may also be collected and transmitted to a remote server, for example, and beneficially be used to locate or track a lost or stolen watercraft as the associated transceiver(s) automatically connect with other vessels that come within transmission range of the lost or stolen watercraft.

FIG. 3 illustrates a block diagram of a portion of a marine networking system 300 in accordance with implementations of various techniques described herein. As shown, the marine networking system 300 may include several components, such as a watercraft 301 and a plurality of marine electronics devices, such as a multi-function display 302a or a handheld computing device 302c, and one or more peripheral marine electronic devices 302b disposed on the watercraft 301. The marine electronics device 302a, 302c may collect data and/or manage and control various navigation related systems or peripheral devices 302b disposed onboard the marine vessel 301. The marine electronics device 302a, 302c may be connected to the peripheral devices 302b by a wired or wireless connection, or over a bus. For example, in certain aspects, the various marine electronics devices 302a, 302c and the peripheral electronic device(s) 302b may be communicatively coupled over a marine network 340 operated onboard the watercraft 301. Components on the marine network 340 may communicate using a National Marine Electronics Association (NMEA) communication standard (e.g., NMEA 2000 or NMEA 0183) or a compatible protocol, including a proprietary compatible protocol. In another implementation, the marine electronics device(s) 302a,c may communicate with each other using a Society of Automotive Engineers (SAE) J1939 communication standard or a compatible protocol, including a proprietary compatible protocol.

As discussed otherwise herein, the watercraft 301 may also be associated with one or more transceivers for establishing a wireless ad hoc LAN with one or more nearby vessels. Transceivers suitable for use in accordance with the present teachings may be associated with the marine electronics device(s) that generate and/or utilize the data (e.g., transceiver 303a of the multi-function display 302a or transceiver 303b of the handheld computing device 302c) or may be communicatively coupled to the marine electronics devices that generate and/or utilize the data. As detailed above, as shown in FIG. 3, the system 300 may utilize a handheld computer device 302c (e.g., a tablet, a smartphone, etc.) associated with watercraft 301 and that contains a transceiver 303b, which may be utilized in accordance with the present teachings to form an ad hoc LAN with other watercraft within the transmission range of transceiver 303b (e.g., the handheld computing device 302c could act as the marine electronics device associated with the watercraft 301). In various aspects, the handheld computer device may itself be in communication with the other marine electronics devices associated with the watercraft such as multifunction display 302a and peripheral device(s) 302b via the network 340 operated on board the watercraft 301.

In various aspects, the marine electronics device may collect data from the marine networking system 300, as well as manage and control various navigation related systems and the peripheral devices 302b, as discussed in further detail below with reference to FIG. 4. With continued reference to FIG. 3, the peripheral device(s) 302b can provide a variety of data with respect to the operation of the watercraft 301. By way of non-limiting example, the peripheral device(s) 302 can include one or more of a sonar system, a Global Positioning System (GPS) device, such as a GPS receiver or a similar device such as GLONASS or global navigation satellite system (GNSS) receiver, a radar system, a propulsion system, various navigation systems, and any other systems, such as lighting systems, wireless data communication devices, wireless audio communications devices, audio and video entertainment devices, weather and environmental sensor systems, etc., disposed onboard the watercraft 301.

The marine electronics device(s) 302a,c can be associated with a user or user account (e.g., set up with remote server 120 of FIG. 1) which may register the marine electronics device(s) 302a,c or watercraft 301 with the user account. The user account may be associated with security information (e.g., an account identification, an account password, etc.), a personal profile (e.g., customer identification, such as name, address, phone number, etc.), product information (e.g., product serial numbers, the type of marine electronics devices, the type of watercraft, and other component information such as for a radar system or sonar system, etc.), and financial information (e.g., customer billing information, credit card information, purchase history, etc.). Security information or other account information may be stored on a remote server, for example, which may be accessed and modified by the user as necessary. The remote server and marine electronics device(s) 302a,c may use security measures to maintain the privacy of users and to protect personally identifiable information or other information.

The user account may be associated with an online profile, such as a profile that is visible to other users on a social networking site. Information in the user account may be synchronized or shared with information displayed in the online profile. The online profile may also be used to display information collected by the marine electronics device(s) 302a,c. As such, the marine electronics device(s) 302a,c may allow a user to manage information in the online profile by changing various settings or information stored in the user account. For example, a user may alter privacy settings regarding which users, such as social media friends, are able to access the user's online profile, or information settings regarding what information is collected or displayed with respect to the user. The online profile may also be synchronized with one or more respective social networking sites. For example, a change to information in the online profile may automatically cause a corresponding change in the information displayed in the respective social networking sites.

FIG. 4 illustrates a schematic diagram of an example multi-function display 400 for use as a marine electronics device in accordance with various implementations described herein. As shown, the multi-function display 400 includes a screen 405. In certain implementations, the screen 405 may be sensitive to touching by a finger. In other implementations, the screen 405 may be sensitive to the body heat from the finger, a stylus, or responsive to a mouse. The device 400 may display marine electronic data 415. The marine electronic data types 415 may include chart data, radar data, sonar data, steering data, dashboard data, navigation data, fishing statistics, vessel systems data, and the like. The multi-function display 400 may also include a plurality of buttons 420, which may be either physical buttons or virtual buttons, or a combination thereof.

The components of the example multi-function display 400 schematically depicted in FIG. 4 are described in more detail with reference to the computing system 500 in FIG. 5.

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that perform particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

FIG. 5 illustrates a computer system 500 into which implementations of various technologies and techniques described herein may be implemented. Computing system 500 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

The computing system 500 may include a central processing unit (CPU) 530, a system memory 526 and a system bus 528 that couples various system components including the system memory 526 to the CPU 530. Although only one CPU 530 is illustrated in FIG. 5, it should be understood that in some implementations the computing system 500 may include more than one CPU 530.

The CPU 530 can include a microprocessor, a microcontroller, a processor, a programmable integrated circuit, or a combination thereof. The CPU 530 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 530 may also include a proprietary processor. The CPU may include a multi-core processor.

The CPU 530 may provide output data to a Graphics Processing Unit (GPU) 531. The GPU 531 may generate graphical user interfaces that present the output data. The GPU 531 may also provide objects, such as menus, in the graphical user interface. A user may provide inputs by interacting with the objects. The GPU 531 may receive the inputs from interaction with the objects and provide the inputs to the CPU 530. In one implementation, the CPU 530 may perform the tasks of the GPU 531. A video adapter 532 may be provided to convert graphical data into signals for a monitor 534, which may also be referred to as a screen. The monitor 534 can be sensitive to heat or touching (collectively referred to as a "touch screen"). In one implementation, the computer system 500 may not include a monitor 534.

The GPU 531 may be a microprocessor specifically designed to manipulate and implement computer graphics. The CPU 530 may offload work to the GPU 531. The GPU 531 may have its own graphics memory, and/or may have access to a portion of the system memory 526. As with the CPU 530, the GPU 531 may include one or more processing units, and each processing unit may include one or more cores.

The system bus 528 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 526 may include a read only memory (ROM) 512 and a random access memory (RAM) 516. A basic input/output system (BIOS) 514, containing the basic routines that help transfer information between elements within the computing system 500, such as during start-up, may be stored in the ROM 512. The computing system may be implemented using a printed circuit board containing various components including processing units, data storage memory, and connectors.

Certain implementations may be configured to be connected to a GPS and/or a sonar system. The GPS and/or sonar system may be connected via the network interface 544 or Universal Serial Bus (USB) interface 542. In one implementation, the computing system 500, the monitor 534, the screen and buttons may be integrated into a console.

The computing system 500 may further include a hard disk drive 536 for reading from and writing to a hard disk 550, a memory card reader 552 for reading from and writing to a removable memory card 556 and an optical disk drive 554 for reading from and writing to a removable optical disk 558, such as a CD ROM, DVD ROM or other optical media. The hard disk drive 550, the memory card reader 552 and the optical disk drive 554 may be connected to the system bus 528 by a hard disk drive interface 536, a memory card interface 538 and an optical drive interface 540, respectively. The drives and their associated computer-readable media may provide nonvolatile storage of computer-readable instructions, data structures, program modules and other data for the computing system 500.

Although the computing system 500 is described herein as having a hard disk 550, a removable memory card 556 and a removable optical disk 558, it should be appreciated by those skilled in the art that the computing system 500 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 500. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 500 may also include a host adapter 533 that connects to a storage device 535 via a small computer system interface (SCSI) bus, a Fiber Channel bus, an eSATA bus, or using any other applicable computer bus interface. The computing system 500 can also be connected to a router 564 to establish a wide area network (WAN) 566 with one or more remote computers. The router 564 may be connected to the system bus 528 via a network interface 544. The remote computers 574 can also include hard disks 572 that store application programs 570.

As discussed otherwise herein, the computing system 500 may wirelessly communicate with one or more electronic devices of other nearby watercraft (e.g., computing system 500b) by establishing an ad hoc wireless local area network (LAN) 576. In some implementations, the computing system 500 may also connect to one or more remote computers 574 via the WAN 566. When using a LAN networking environment, the computing system 500 may be connected to the LAN 576 through the network interface or adapter 544. The LAN 576 may be implemented using Wi-Fi technology, Bluetooth, cellular technology, or any other implementation known to those skilled in the art. The network interface 544 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 574. It will be appreciated that the network connections shown are exemplary and other means of establishing a communications link between the computer systems may be used. The network interface 544 may also include digital cellular networks, Bluetooth, or any other wireless network interface.

A number of program modules may be stored on the hard disk 550, memory card 556, optical disk 558, ROM 512 or RAM 516, including an operating system 518, one or more application programs 520, program data 524 and a database system. The one or more application programs 520 may contain program instructions configured to perform methods according to various implementations described herein. The operating system 518 may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 500 through input devices such as a keyboard 562 and pointing device. Other input devices may include a microphone, joystick, game pad, satellite dish, scanner, user input button, wearable device, or the like. These and other input devices may be connected to the CPU 530 through a USB interface 542 coupled to system bus 528, but may be connected by other interfaces, such as a parallel port, Bluetooth or a game port. A monitor 534 or other type of display device may also be connected to system bus 528 via an interface, such as a video adapter 532. In addition to the monitor 534, the computing system 500 may further include other peripheral output devices such as speakers and printers.

FIG. 6 illustrates a flow diagram for an example method 600 for distributing data among a plurality of watercraft in accordance with implementations of various techniques described herein. In one implementation, various operations of the method 600 may be performed by the marine electronics device 400 of FIG. 4 associated with a first watercraft and various operations of the method 600 may be performed by one or more similar marine electronics devices associated with a plurality of other watercraft and/or a remote computing system. It should be understood that while method 600 indicates a particular order of execution of operations, in some implementations, certain portions of the operations might be executed in a different order. Further, in some implementations, additional operations or blocks may be added to the method 600. Likewise, some operations or blocks may be omitted.

At block 610, the marine electronics device may collect data for distribution to or through one or more other nearby watercraft. The collected data may describe which devices are or were connected to the marine electronics device, how the marine electronics device was used, any problems a user experienced, system performance history regarding one or more software or hardware components, a crash history regarding one or more software applications operating on the marine electronics device, a user interface history, a record of how often a user changes pages, a record describing which user interface setup is preferred or most commonly used, a web browser history, how often particular software features are selected by a user, or other data relating to the operation of the marine electronics device.

At block 615, the marine electronics device 400 may additionally or alternatively collect data from one or more peripheral devices (e.g., peripheral device 302b of FIG. 3) associated with the first watercraft. The data from the peripheral device(s) associated with the first watercraft may include telematics data transmitted over the marine networking system (e.g., network 340 of FIG. 3). Such telematics data may include network information obtained from any device or system capable of being measured or controlled through electronic means, such as analog or digital methods. The devices or systems may include switch position and switch activation systems, electric power generation and supply systems, such as AC and DC electrical systems, water management systems, lighting systems, and security systems. The telematics data may also describe whether any errors, faults, or problems have occurred in these and other systems such as the sonar system, radar system, and other peripheral devices. The telematics data may also describe the GPS location of the watercraft when an error, fault, or problem occurred.

The telematics data may include information regarding measurements from sensors in an engine on the watercraft. For example, the engine sensors may record engine operating conditions such as data describing the engine's performance, how long the engine has been operating, information on engine alarms, or the results of engine diagnostic tests. The telematics data may also include data associated with an NMEA communication standard. The NMEA communication standard may provide a protocol for transmitting and receiving data acquired by sensors and marine instruments. Examples of devices that may communicate using an NMEA communication standard include auto pilots, wind instruments, water temperature gauges, depth sounders, vessel control devices, and engine instruments.

The telematics data may include data regarding navigational and environmental conditions around the watercraft. The marine electronics device may receive the navigation and environmental data from instruments disposed on the watercraft. For example, the marine electronics device may receive air temperature data, water temperature data, weather information, wind data, heading data, bearing data, location data, sonar data, radar data, engine and propulsion data, vessel control data, or any other navigational or environmental data.

In various aspects, the collected data may describe one or more user activities monitored by the marine electronics device (or any peripheral device(s)), such as data relating to fishing logs, trip logs, or other activities engaged in by a user of the marine electronics device. Fishing logs, for example, may comprise data regarding a catch, such as the location of a catch, the time of the catch, the size of the fish caught, the type of fish caught, or weather conditions when the fish was caught. Trip logs may comprise data regarding the starting time and ending time of a trip, locations visited on the trip, or navigation conditions during the trip. In one implementation, a software application operating in the background of the marine electronics device may perform block 610 automatically. For example, the background software application may be running without being displayed on a user interface.

At block 620, the marine electronics device may store the data collected by the marine electronics device at block 610 or the data received from the peripheral device(s) at block 615. The marine electronics device may store the data in memory or a hard disk on the marine electronics device, or to an external storage device. In one implementation, the data may be stored in a database on the marine electronics device.

At block 625, the marine electronics device may activate a transceiver configured as otherwise discussed herein to form an ad hoc LAN with one or more nearby watercraft. By way of example, the marine electronics device may generate a beacon that may received by a transceiver of another watercraft when within wireless transmission range. As discussed above, the beacon may indicate to devices of other watercraft within transmission range that the marine electronics device is present and/or ready to initiate a communications session. Additionally or alternatively, at block 625, the marine electronics device may be configured to detect a similar beacon generated by one or more nearby watercraft indicating that the electronic device(s) of the one or more nearby watercraft is available to generate a wireless network communication session.

Additionally, in some implementations, the beacon may include advertisement data packets regarding an inventory of the data available by the electronic device and the services offered (e.g., WAN connection status), the target of the data, the importance of the data, the age of the data, and/or the number of "hops" to which the data has already been subjected, all by way of non-limiting example. In the case where the marine electronics device collects the data as in block 610 and 615, the advertisement may indicate, for example, that the marine electronics device is the source of the data by setting the number of previous "hops" to zero.

At block 630, one or more electronic devices of other nearby watercraft that detected the beacon generated in block 625 may initiate a "handshake" response to confirm that the electronic device(s) of nearby watercraft have received the beacon and is also available for a communications session. Such a response may also provide advertisement data to identify services (e.g., WAN connection status) and/or to confirm any data also available to be transferred. In a case in which the marine electronics device detects a beacon generated by one or more nearby watercraft, the marine electronics device may alternatively send such a response.

At block 635, the marine electronics device 400 may be able to determine, which if any of the electronic devices of the nearby watercraft should receive the data to be transmitted. For example, in a case that the collected data is intended to be ultimately transmitted to a remote server, the marine electronics device 400 may select to transfer the collected data to only one, some, or all of a plurality of nearby watercraft based on the indication that the electronic device of the selected watercraft is currently connected to a WAN or is able to connect to a WAN. In some aspects, the collected data may be selected to transfer data to any available watercraft.

At block 640, the data collected by the marine electronics device 400 may be transmitted to one or more electronic devices of other watercraft within the ad hoc LAN. The receiving electronic device(s) of the other watercraft may then similarly proceed to store the data (e.g., as in block 620), transmit the data to other watercraft within the established ad hoc network or as the receiving electronic device subsequently joins one or more additional ad hoc networks, for example, as the watercraft travels around the body of water. Alternatively, as discussed otherwise herein, the data received from the electronic device may be uploaded to a remote server, for example, upon the original receiving device connecting to a WAN.

FIG. 7 illustrates a flow diagram for another method 700 for distributing data among a plurality of watercraft in accordance with implementations of various techniques described herein. In one implementation, various operations of the method 700 may be performed by the marine electronics device 400 of FIG. 4 associated with a first watercraft and various operations of the method 700 may be performed by one or more similar marine electronics devices associated with a plurality of other watercraft. It should be understood that while method 700 indicates a particular order of execution of operations, in some implementations, certain portions of the operations might be executed in a different order. Further, in some implementations, additional operations or blocks may be added to the method 700. Likewise, some operations or blocks may be omitted.

At block 710, the marine electronics device may receive and cache data that was generated at a remote server. The server may be operated by a vendor and the data may comprise a large data file, for example, containing a software update for marine electronic devices sold or supported by the vendor. In various aspects, the device may receive the data from the remote server over a WAN or through communication with a WAN-enabled device. By way of example, a memory card that can be inserted within the marine electronics device may contain the data file. Alternatively, the marine electronics device may receive and cache the large data file (or a portion thereof) from one or more communication sessions with the electronic devices of other nearby watercraft as discussed otherwise herein.

At block 715, the marine electronics device may cause a transceiver to generate a beacon that may be received by another transceiver when within wireless transmission range. In some implementations, the beacon may indicate that the marine electronics device is ready to initiate a communications session and has a data file containing a critical software update.

Upon receiving a handshake from one or more marine electronics devices associated with other watercraft within transmission range of the beacon and a request for a transfer of the software update (or a portion thereof), a communication session may be initiated in block 720 between the marine electronics device and the marine electronics devices of the other nearby watercraft.

In block 725, the marine electronics device may initially transmit a small data file to confirm security of the software update and/or the identity of the requesting party prior to transmitting the software update data file itself. By way of example, the small data file may contain a signature that can be confirmed by the receiving watercraft prior to requesting the transfer of the software update. In some implementations, because the receiving watercraft may have already received at least a portion of the software update from a previous transfer, the receiving watercraft may send a request for any missing chunks.

In block 730, the marine electronics device may receive the request for the data file (or chunks thereof) and transmits the chunks to the requesting device of the ad hoc LAN. As discussed otherwise herein, in some implementations, if the LAN connection fails prior to receiving one or more chunks, the receiving device can continue to request the missing chunks, for example, from other devices of watercraft as the watercraft associated with the receiving device traverses the body of water.

Upon confirming that the entire data file has been downloaded (through one or more communication sessions), the receiving device may notify a user in block 735 that a new software update has been received and is available for installation.

At block 740, the receiving device can transmit the received data file (or chunks thereof) to other watercraft within the established ad hoc network or as the receiving electronic device subsequently joins one or more additional ad hoc networks, for example, as the watercraft travels around the body of water.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A method comprising:

receiving, at an electronic device associated with a first watercraft, marine electronics data from an electronic device associated with a second watercraft, wherein the marine electronics data is transmitted over a first wireless local area network established between the electronic device associated with the first watercraft and the electronic device associated with the second watercraft, wherein the first watercraft includes a motor for propelling the first watercraft along a body of water;

establishing a second wireless local area network between the electronic device associated with the first watercraft and an electronic device associated with a third watercraft; and transmitting at least a portion of the marine electronics data received from the electronic device associated with the second watercraft from the electronic device associated with the first watercraft to the electronic device associated with the third watercraft over the second wireless local area network.

2. The method of claim 1, further comprising:

in an instance in which an intended final recipient of marine electronics data stored by the electronic device associated with the first watercraft is a remote server and the electronic device associated with the first watercraft is communicatively coupled to the remote server, the electronic device associated with the first watercraft transmitting the stored marine electronics data to the remote server.

3. The method of claim 2, further comprising:
in an instance in which the electronic device associated with the first watercraft is not communicatively coupled to the remote server, the electronic device associated with the first watercraft transmitting the stored marine electronics data to an electronic device associated with another watercraft over a third wireless local area network established therebetween.

4. The method of claim 2, wherein the electronic device associated with the first watercraft is communicatively coupled to the remote server via a wide area network.

5. The method of claim 4, wherein the wide area network comprises a cellular network, a satellite network, or the Internet.

6. The method of claim 2, wherein in the instance in which the intended final recipient of the stored marine electronics data is the remote server and the stored marine electronics data is transmitted to the remote server from the electronic device associated with the first watercraft, the electronic device associated with the first watercraft is configured to no longer transmit the stored marine electronics data to electronic devices associated with other watercraft, wherein the other watercraft include the second watercraft and the third watercraft.

7. The method of claim 1, wherein the marine electronics data received from the electronic device associated with the second watercraft comprises marine electronics data provided by a remote server for controlling operation of a plurality of electronic devices, each of which is associated with one of a plurality of watercraft.

8. The method of claim 1, wherein the marine electronics data received from the electronic device associated with the second watercraft comprises marine electronics data generated by one or more electronic devices associated with the second watercraft.

9. The method of claim 8, wherein the marine electronics data received from the electronic device associated with the second watercraft comprises marine electronics data generated by an electronic device associated with a fourth watercraft.

10. The method of claim 1, wherein the first and second wireless local area network comprises a mesh network.

11. The method of claim 1, wherein the marine electronics data comprises a marine electronics software update data file.

12. The method of claim 1, further comprising transmitting a beacon from the electronic device associated with the first watercraft to notify the electronic device of the third watercraft that the first watercraft is available to establish the second wireless local area network.

13. The method of claim 12, further comprising receiving, at the electronic device associated with the first watercraft, a response to the beacon generated by the electronic device associated with the third watercraft.

14. The method of claim 13, wherein the response comprises a request by the electronic device associated with the third watercraft for at least a portion of the marine electronics data received from the second watercraft.

15. The method of claim 1, further comprising receiving, at the electronic device associated with the first watercraft, a beacon transmitted from the electronic device associated with the third watercraft to notify the electronic device of the first watercraft that the third watercraft is available to establish the second wireless local area network.

16. The method claim 1, wherein the marine electronics data received from the electronic device associated with the second watercraft comprises information regarding a number of hops to which the marine electronics data has been subjected, and wherein the information regarding the number of hops is adjusted by the electronic device associated with the first watercraft when the marine electronics data received from the electronic device associated with the second watercraft is transmitted to the electronic device associated with the third watercraft.

17. The method claim 1, wherein the marine electronics data received from the electronic device associated with the second watercraft comprises information regarding a number of hops to which the marine electronics data has been subjected, and wherein the electronic device associated with the first watercraft prevent transmission of the marine electronics data to the electronic device associated with the third watercraft when the number of hops to which the marine electronics data exceeds a predetermined maximum number of hops.

18. The method of claim 1, wherein the marine electronics data received from the electronic device associated with the second watercraft comprises at least a first portion of a data file divided into a plurality of portions, and wherein:
the electronic device associated with the first watercraft is configured to obtain a second portion of the plurality of portions from another electronic device associated with a different watercraft from the second watercraft; and
the electronic device associated with the first watercraft is configured to transmit the first portion and the second portion to the electronic device associated with the third watercraft.

19. An electronic device associated with a watercraft having a motor for propelling the watercraft along a body of water, the electronic device comprising:
a transceiver;
one or more processors; and
a memory including computer program code configured to, when executed, cause the one or more processors to:
receive, via the transceiver, marine electronics data transmitted from an electronic device associated with a second watercraft over a first wireless local area network;
establish a second wireless local area network with an electronic device associated with a third watercraft; and
transmit, via the transceiver, at least a portion of the marine electronics data received from the electronic device associated with the second watercraft to the electronic device associated with the third watercraft over the second wireless local area network.

20. A non-transitory computer-readable medium having stored thereon a plurality of computer-executable instructions which, when executed by a computer cause the computer to:
receive, at an electronic device associated with a first watercraft having a motor for propelling the first watercraft along a body of water, marine electronics data from an electronic device associated with a second watercraft, wherein the marine electronics data is transmitted over a first wireless local area network established between the electronic device associated with the first watercraft and the electronic device associated with the second watercraft;

establish a second wireless local area network between the electronic device associated with the first watercraft and an electronic device associated with a third watercraft; and transmit at least a portion of the marine electronics data received from the electronic device associated with the second watercraft from the electronic device associated with the first watercraft to the electronic device associated with the third watercraft over the second wireless local area network.

\* \* \* \* \*